July 31, 1934.  J. C. CURTIS  1,968,380
LUG CHUCK FOR ROCK DRILLS
Filed Aug. 13, 1932
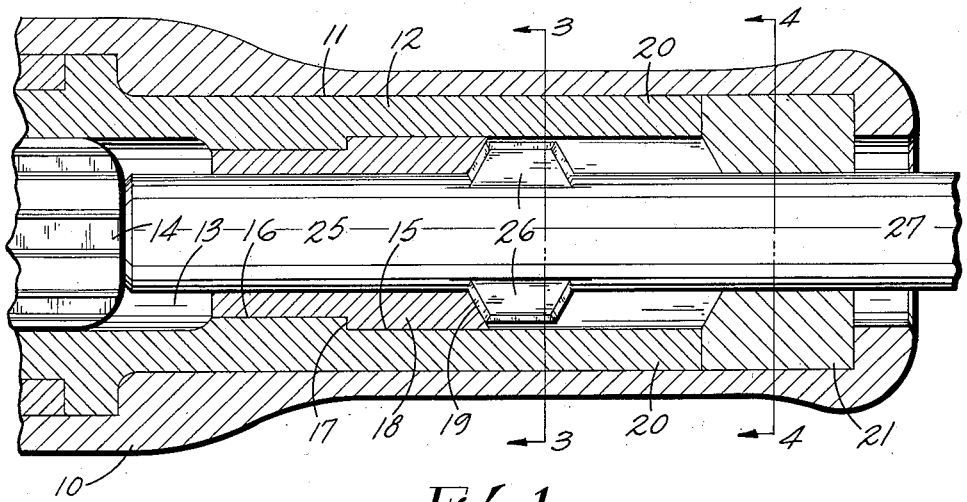
Fig. 1
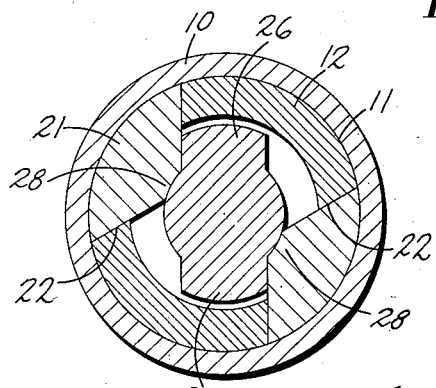
Fig. 3
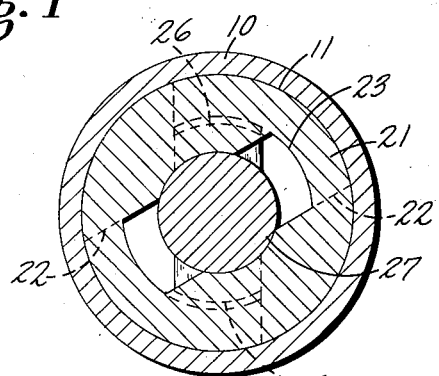
Fig. 4
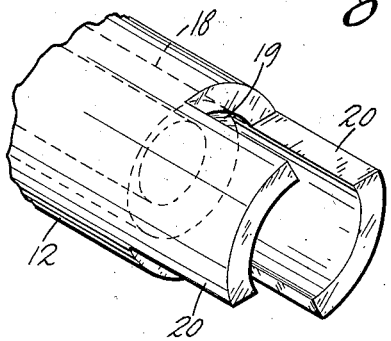
Fig. 2
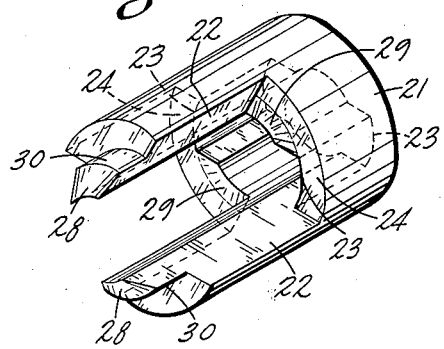
JOHN C. CURTIS
INVENTOR
BY *John E. Renfer*
ATTORNEY Patented July 31, 1934

1,968,380

UNITED STATES PATENT OFFICE 1,968,380

LUG CHUCK FOR ROCK DRILLS

John C. Curtis, Cleveland, Ohio

Application August 13, 1932, Serial No. 628,729

3 Claims. (Cl. 121—7)

This invention relates broadly to rock drills but more particularly to the lug chuck construction for rock drills, wherein the chuck is adapted to receive the lug steel and impart rotation thereto.

One object of this invention is to produce a lug chuck of simple design which can be manufactured in such a manner as to permit the best heat treatment of the surfaces subjected to wear, thus prolonging the period of usefulness of the chuck mechanism.

Other objects will be in part obvious and in part pointed out hereinafter.

In the drawing which illustrates a preferred embodiment of the invention.

Fig. 1 is a longitudinal sectional view of the front end of a rock drill embodying the invention.

Fig. 2 is a perspective view of certain of the parts shown in Fig. 1.

Fig. 3 is a cross sectional view taken in a plane indicated by line 3—3 in Fig. 1.

Fig. 4 is a view similar to Fig. 3 taken in a plane indicated by line 4—4 in Fig. 1.

Referring to the drawing, in which like symbols designate corresponding parts throughout the several views, there is shown a front housing 10 constituting the front portion of a rock drill. This housing is provided with a cylindrical bore 11 having a sleeve 12 rotatable therein. The rear end of the sleeve 12 is formed with a chamber 13, with the wall thereof properly machined to slidably but non-rotatably receive the fluted end of a piston 14, capable to impart rotation to the sleeve 12. Formed within the front portion of the sleeve 12, there is a bore 15 provided with a restricted portion 16 affording at their intersection a shoulder 17. Secured in pressed fit engagement within the sleeve bore 15 but capable of being removed therefrom, there is a bushing 18 having its longitudinal movement in one direction limited by its engagement with the bushing shoulder 17. The front face of the bushing 18 is tapered as at 19, the purpose of which will be explained later.

Extending from the front face of the sleeve 12 and integral therewith, there is a duality of diametrically opposed clutch jaws 20, the internal wall of these jaws being a continuation of the sleeve bore 15.

Rotatably mounted within the front end of the front housing bore 11, there is a chuck 21 formed with a duality of diametrically opposed clutch jaws 22 capable of cooperation with the sleeve clutch jaws 20 to lock the two parts against relative rotation. The unbroken portion of the chuck 21 is formed with a slot 23 opening into the base 24 of the jaws 22. This slot is properly machined to permit the passage of the shank 25 and lug 26 of the drill steel 27. The internal wall of the clutch jaws 22 is a continuation of the circular portion of the slot 23 through which the shank 25 is free to pass, which is of smaller diameter than the diameter of the sleeve bore 15. Thus when the clutch jaws 20 and 22 are positioned for engagement with each other, the jaws 22 extend inwardly of the jaws 20 to form a duality of diametrically opposed ribs 28 against which the lugs 26 of the drill steel 27 are capable of engagement. Consequently, when the sleeve 12 is rotated by the piston 14, the rotation is transmitted to the chuck 21 by means of the cooperating clutch jaws 20 and 22, and to the drill steel 27 by the engagement of the lugs 26 with one face of each clutch jaws 22 or ribs 28. The slot 22 is located with one side tangent to the non-engaging wall of the ribs 28 with the lug 26, and with its other side located in spaced relation with the engaging wall of the ribs 28 with the lugs 26, thus constituting a land 29 between the clutch jaws 22. This land is tapered inwardly for engagement with the tapered front end of the lugs 26, limiting thereby the longitudinal movement in one direction of the drill steel 27. The longitudinal movement of the drill steel 27 in the other direction is limited by the engagement of the lugs 26 with the tapered face 19 of the bushing 18. The ends of the clutch jaws 22 or the ends of the ribs 28 are properly machined, as at 30, for engagement within the bore 15 of the sleeve 12. By this engagement, when torque resistance is applied to the drill steel 27, the clutch jaws 22, transmitting rotation thereto, are prevented to spread away from each other, overcoming thereby the breakage of the jaws. The longitudinal movement of the chuck 21 is limited by its engagement with the front housing 10, and by the engagement of the ends of the clutch jaws 22 with the base of the clutch jaws 20.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. In a rock drill of the hammer type, the combination of a front housing and a drill steel extending therein, lugs on said drill steel, a sleeve rotatable within said front housing, driving jaws extending from said sleeve, a chuck rotatable within said front housing within which the lugs of said steel are free to slide, driven jaws extending from said chuck adapted for engagement with said driving jaws to transmit the rotation of said sleeve to said chuck, said driven jaws protruding inwardly of said driving jaws affording thereby driving ribs capable of engagement with the lugs of said drill steel to impart rotation to the latter, the ends of said driving ribs extending past the outer ends of said driven jaws for engagement with the internal wall of said sleeve to prevent the spreading of said driven jaws away from each other when transmitting rotation to said drill steel.

2. In a rock drill of the hammer type, the combination of a front housing and a drill steel extending therein, lugs on said drill steel, a sleeve rotatable within said front housing, a bore within said sleeve, a removable bushing within said bore through which the end portion of said drill steel passes for guiding the latter in axial alignment within said front housing, driving jaws extending from said sleeve, a chuck rotatable within said front housing within which the lugs of said steel are free to slide, driven jaws extending from said chuck capable of engagement with said driving jaws to transmit the rotation of said sleeve to said chuck, said driven jaws being capable of engagement with the lugs of said drill steel to impart rotation to the latter, the ends of said driven jaws being formed for engagement within said bore to prevent the spreading of said driven jaws away from each other when transmitting rotation to said drill steel.

3. In a chuck for rock drill, a sleeved member capable of rotation, a rotation mechanism associated with said sleeved member to effect its rotation, driving jaws extending from said sleeved member, a rotatable chuck member adapted to slidably receive the lugged shank of a cutting tool, driven jaws extending from said chuck member capable of engagement with said driving jaws for transmitting the rotation of said sleeved member to said chuck member, means within said chuck member engageable with the lugs of said shank for transmitting the rotation of the former to said cutting tool, and means extending from said driven jaws engageable with the inner wall of said sleeve to prevent the spreading of said driven jaws away from each other during the transmission of rotation from said chuck member to said cutting tool.

JOHN C. CURTIS.